Figure 1:
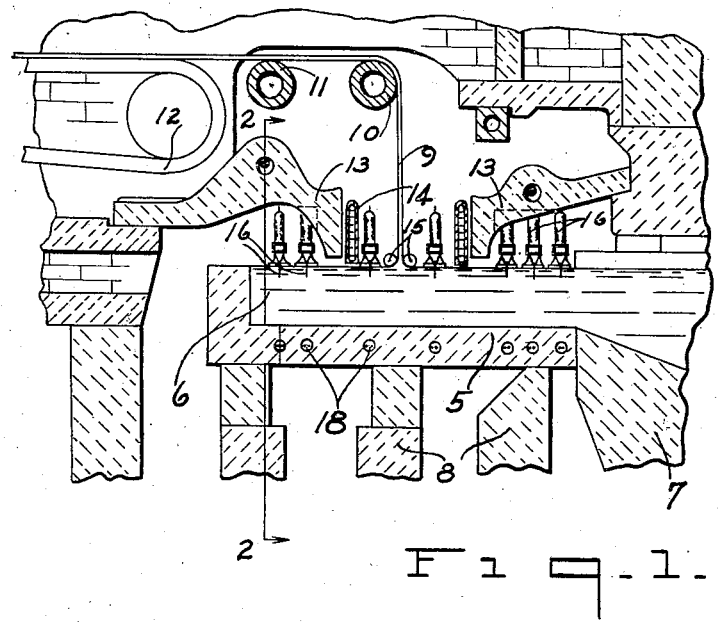

Nov. 18, 1930.  J. L. DRAKE  1,781,917

HEATING MEANS FOR SHEET GLASS APPARATUS

Filed Nov. 17, 1926

Inventor
John L. Drake
By Frank Fraser
Attorney

Patented Nov. 18, 1930

1,781,917

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

HEATING MEANS FOR SHEET-GLASS APPARATUS

Application filed November 17, 1926. Serial No. 148,789.

This invention relates to sheet glass apparatus, and more particularly to improved means for heating a mass of molten glass from which a sheet may be formed.

In certain systems for producing sheet glass, a continuous sheet is drawn upwardly from a mass of molten glass contained within a receptacle or so-called draw pot, and then while still in a semi-plastic condition, although substantially set in its final sheet form, is bent into a horizontal plane about a rotatable bending member and carried off through a suitable drawing mechanism and into an annealing leer. Heretofore, a certain portion of the glass contained within the draw pot would, after a time, become cooled and subsequently devitrified to form so-called dog metal. This dog metal is detrimental to the production of a good sheet of glass and consequently must be removed from time to time. This can only be accomplished, however, by shutting down the machine and boiling or cleaning out the draw pot, which of course, consumes considerable time and labor and reduces the output of the machine.

It is, therefore, the primary object of this invention to provide, in sheet glass apparatus, improved means for heating the receptacle or draw pot and the molten glass contained therein whereby to reduce to a minimum the formation of so-called dog metal.

Another important object of the invention is to provide, in sheet glass apparatus, means for maintaining the mass of molten glass within the receptacle at a relatively constant and uniform temperature to aid in the drawing of a good sheet of glass.

A further object of the invention is to provide, in sheet glass apparatus, means for heating the receptacle and molten glass contained therein, and means for automatically reducing the heating effect of the heating means when the molten glass reaches a predetermined temperature.

A further object of the invention is to provide, in sheet glass apparatus, means for preventing the temperature of the molten glass within the receptacle from falling below a predetermined point.

A still further object of the invention is the provision of means for heating the molten glass within the receptacle, together with additional means for heating the glass and for automatically lessening the heating effect of the first heating means when the temperature of said glass reaches a predetermined point.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through improved sheet glass apparatus constructed in accordance with the present invention.

Figure 2:
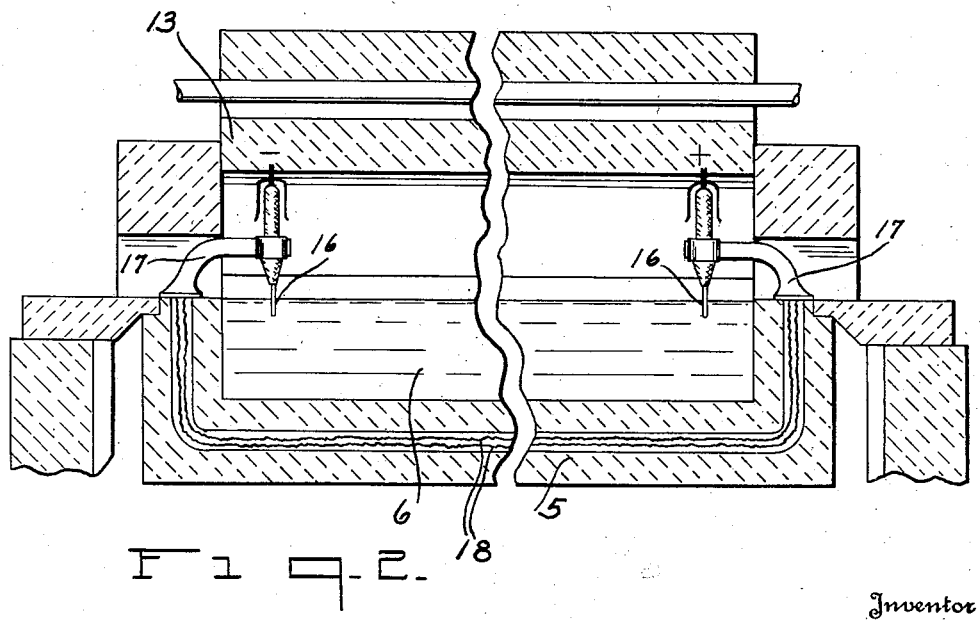

Fig. 2 is a vertical section taken on line 2—2 of Fig. 1.

In the drawings, the numeral 5 designates a receptacle or draw pot which may be formed from a suitable refractory material and which is continuously replenished with a source of molten glass 6 from any form of tank 7. The receptacle 5 is supported upon stools 8, and is also heated from beneath by burners which are not shown. A sheet of glass 9 is drawn upwardly from the source of molten glass 6 and at a substantial distance therefrom is deflected into a horizontal plane over a bending member 10, after which the said sheet is passed over an idler roll 11, through a drawing mechanism 12, into an annealing leer where it is gradually reduced to room temperature as is well known in the art.

Arranged above the receptacle 5 are cover or lip tiles 13 which tend to force any heat currents present at that position downwardly toward the surface of the molten glass 6. Cooling members 14 are arranged at opposite sides of the sheet and closely adjacent the surface of the molten glass 6 to protect the said sheet and to also absorb sufficient heat from the glass passing thereunder to permit the drawing of a good sheet of glass. To maintain the sheet to width, knurled rollers 15, or similar means, are arranged to engage opposite sides of the sheet at both edges thereof.

In accordance with the present invention, a plurality of electrodes 16 are arranged at opposite sides of the receptacle 5, said electrodes depending downwardly into the molten glass 6 as shown in Fig. 2 and being carried by brackets 17. Any suitable number of these electrodes may be used and they may be positioned at any desired distance apart. Each pair of oppositely disposed electrodes are adapted to be connected by means of an electrical heat resistance element consisting of one or any preferred number of wires 18, said wires being arranged within the side walls and bottom wall of the receptacle 5. Thus, the electrodes and resistance elements are connected in parallel.

It is well known that glass at high temperatures, and especially when in a molten condition, becomes a relatively good conductor of electricity and this property of becoming a fairly good electrical conductor when molten, makes it possible to heat glass electrically by the passage of a sufficiently heavy current therethrough. However, when the temperature of glass falls to a certain point, it loses its powers of conductivity and becomes an insulator.

In operation, when the glass is at such a temperature as to insulate the electrodes 16 from each other, all of the current will pass through the resistance elements 18 which will then function to heat up the glass. When the glass reaches such a temperature as to become a conductor, however, a part of the current will then pass through the molten glass and a part through the resistance elements. Broadly stated, the current will divide between the two paths of the parallel circuit, in inverse ratio to the resistances of the two paths. In other words, when the resistance elements 18 offer less resistance than the molten glass, a greater portion of the current will pass therethrough but, on the other hand, when the glass is heated to a temperature where it offers less resistance to the electric current than the resistance wires 18, a greater portion of the electric current will pass through the molten glass between the electrodes 16. For example, the heat resistance elements 18, arranged within the walls of receptacle 5, are adapted to have less electrical resistance than the molten glass at a temperature of 1600° Fahrenheit but greater resistance than the glass at 1800° Fahrenheit. Consequently, when the temperature of the molten glass is at approximately 1600° Fahrenheit or less (but sufficiently high to still render it a conductor) a greater portion of the electric current will pass through the elements 18 to heat up the glass but when the temperature of the molten glass reaches approximately 1800° Fahrenheit or over, a greater portion of the electrical current will pass through the glass between the electrodes than will pass through the resistance elements so that the heating effect of the resistance elements will be automatically reduced or lessened. The electrical current passing through the molten glass will act to heat the same and maintain it at a relatively predetermined constant and uniform temperature.

The wires 18 not only serve to heat the glass up to a desired temperature initially, but also act as a safety means and should the glass, for one reason or another, become cooled and the temperature thereof drop to 1600° Fahrenheit, a greater portion of the current will automatically pass through the said wires 18 so that they will again function to heat the molten glass up to a point where a greater portion of the electrical current will be caused to pass through the said glass.

By the provision of the present improved heating means, the molten glass 6 will always be maintained at a relatively constant temperature, and the maintaining of the glass at such a relatively constant temperature will aid in the drawing of a good sheet of glass. Moreover, with such an arrangement, the formation of dog metal within the receptacle will be reduced to a minimum inasmuch as the molten glass contained therein will not be permitted to cool to such a degree as will allow the glass to become devitrified.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In glass apparatus, a receptacle adapted to contain a mass of molten glass, an electrical heat resistance element for heating said glass, and a plurality of electrodes acting to automatically lessen the heating effect of said heat resistance element when the glass reaches a predetermined temperature, said electrodes then functioning to effect a heating of the glass whereby to maintain it at such predetermined temperature.

2. In glass apparatus, a receptacle adapted to contain a mass of molten glass, an electrical heat resistance element for heating said glass, and a plurality of electrodes depending within the glass for lessening the heating effect of said heat resistance element when the glass reaches a predetermined temperature, said electrodes being then automatically connected to effect a heating of the glass whereby to maintain it at such predetermined temperature.

3. In glass apparatus, a receptacle adapted to contain a mass of molten glass, a plurality of electrical heat resistance elements arranged within the walls of said receptacle for heating the molten glass contained therein, and a plurality of electrodes depending within said molten glass for lessening the heating effect of said heat resistance elements when the molten glass reaches a predetermined temperature, a greater portion of the electric current then passing through the molten glass between the electrodes.

4. In glass apparatus, a receptacle adapted to contain a mass of molten glass, means for heating said glass, and additional means for heating the glass and for automatically reducing the heating effect of the first heating means when the glass reaches a predetermined temperature.

5. In glass apparatus, a receptacle adapted to contain a mass of molten glass, electrically operated means for heating said glass, and additional electrically operated means for heating the glass and for automatically reducing the heating effect of the first heating means when the molten glass reaches a predetermined temperature.

6. In glass apparatus, a receptacle adapted to contain a mass of molten glass, an electrical heat resistance element for heating said glass, and a plurality of electrodes for also heating the glass and for automatically reducing the heating effect of the said resistance element when the molten glass reaches a predetermined temperature.

7. In glass apparatus, a receptacle containing a mass of molten glass, two sets of heating means associated with said receptacle, said sets of heating means being inter-related in a manner that one set is first used for heating the glass in the receptacle and the other set then used to maintain the glass at the desired temperature, the temperature of the glass effecting the change from one set of heating means to the other.

8. In glass apparatus, a receptacle containing a mass of molten glass, two sets of heating means associated with said receptacle, said sets of heating means being inter-related in a manner that one set is first used for heating the glass in the receptacle and the other set then used to maintain the glass at the desired temperature, the temperature of the glass effecting the change from one set of heating means to the other, the change from one set of heating means to the other being automatic when the glass reaches a predetermined temperature.

9. In glass apparatus, a receptacle containing a mass of molten glass, two sets of heating means associated with said receptacle, said sets of heating means being inter-related in a manner that one set is first used for heating the glass in the receptacle and the other set then used to maintain the glass at the desired temperature, the temperature of the glass effecting the change from one set of heating means to the other, one set of heating means having a portion immersed in said molten glass.

10. In glass apparatus, a receptacle containing a mass of molten glass, two sets of heating means associated with said receptacle, said sets of heating means being inter-related in a manner that one set is first used for heating the glass in the receptacle and the other set then used to maintain the glass at the desired temperature, the temperature of the glass effecting the change from one set of heating means to the other, one set of heating means having a portion immersed in said molten glass, the change from one set of heating means to the other being automatic when the glass reaches a predetermined temperature.

11. In glass apparatus, a receptacle containing a mass of molten glass, two sets of heating means associated with said receptacle, said sets of heating means being inter-related in a manner that one set is first used for heating the glass in the receptacle and the other set then used to maintain the glass at the desired temperature, the temperature of the glass effecting the change from one set of heating means to the other, one set of heating means having a portion immersed in said molten glass, and the other set of heating means being arranged in the walls of said receptacle.

12. In glass apparatus, a receptacle containing a mass of molten glass, two sets of heating means associated with said receptacle, said sets of heating means being inter-related in a manner that one set is first used for heating the glass in the receptacle and the other set then used to maintain the glass at the desired temperature, the temperature of the glass effecting the change from one set of heating means to the other, one set of heating means having a portion immersed in said molten glass, and the other set of heating means being arranged in the walls of said receptacle, the change from one set of heating means to the other being automatic when the glass reaches a predetermined temperature.

13. In glass apparatus, a receptacle containing a mass of molten glass, two sets of electrical heating means associated with said receptacle and arranged in parallel, said sets of heating means being inter-related in a manner that one set is first used for heating the glass in the receptacle and the other set then used to maintain the glass at the desired temperature, the temperature of the glass effecting the change from one set of heating means to the other.

14. In glass apparatus, a receptacle containing a mass of molten glass, two sets of electrical heating means associated with the receptacle, one set of electrical heating means being embedded in the walls of the receptacle, the other set of electrical heating means having portions immersed in the mass of molten glass, the two sets of heating means being arranged in parallel in a manner that one set is first used for heating the glass in the receptacle and the other set then used to maintain the glass at the desired temperature, the temperature of the glass effecting the change from one set of heating means to the other.

15. In glass apparatus, a receptacle containing a mass of molten glass, two sets of electrical heating means associated with the receptacle, one set of electrical heating means being embedded in the walls of the receptacle, the other set of electrical heating means having portions immersed in the mass of molten glass, the two sets of heating means being connected in parallel in a manner that one set is first used for heating the glass in the receptacle and the other set then used to maintain the glass at the desired temperature, the temperature of the glass effecting the change from one set of heating means to the other, the change from one set of heating means to the other being automatic when the glass attains a predetermined temperature.

16. In glass apparatus, a receptacle adapted to contain a mass of molten glass, electrical means for heating the glass, and electrical means for automatically reducing the heating effect of said heating means when the glass reaches a predetermined temperature, said electrical reducing means then acting as a heating means to maintain the glass at such predetermined temperature.

17. In glass apparatus, a receptacle adapted to contain a mass of molten glass, electrical heating means for heating the glass, and additional electrical heating means acting to automatically lessen the heating effect of the first mentioned heating means when the glass reaches a predetermined temperature, said first and second named heating means being connected in parallel, and a portion of the second named heating means being disposed within the molten glass.

18. In glass apparatus, a receptacle adapted to contain a mass of molten glass, a plurality of electrical resistance elements arranged out of contact with the glass but provided to heat the same, and a plurality of electrodes immersed within the molten glass and also adapted to heat the same, said resistance elements and electrodes being connected in parallel, a greater portion of the electric current passing through the resistance elements when the temperature of the glass falls below a predetermined point and a greater portion of the current passing through the glass between the electrodes when the temperature of the glass rises to a predetermined point.

Signed at Toledo, in the county of Lucas and State of Ohio, this 13th day of November, 1926.

JOHN L. DRAKE.